US012388188B2

(12) United States Patent
Xie et al.

(10) Patent No.: US 12,388,188 B2
(45) Date of Patent: Aug. 12, 2025

(54) REFLECTIVE ARRAY ANTENNA AND BASE STATION

(71) Applicant: HUAWEI TECHNOLOGIES CO., LTD., Guangdong (CN)

(72) Inventors: Qingming Xie, Shanghai (CN); Zeqing Lu, Xi'an (CN); Dashuang Liao, Shenzhen (CN); Long Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 163 days.

(21) Appl. No.: 18/458,059

(22) Filed: Aug. 29, 2023

(65) Prior Publication Data

US 2023/0402763 A1 Dec. 14, 2023

Related U.S. Application Data

(63) Continuation of application No. PCT/CN2022/076939, filed on Feb. 18, 2022.

(30) Foreign Application Priority Data

Mar. 1, 2021 (CN) ......................... 202110226874.9

(51) Int. Cl.
*H01Q 1/48* (2006.01)
*H01Q 15/14* (2006.01)

(52) U.S. Cl.
CPC ............... *H01Q 15/14* (2013.01); *H01Q 1/48* (2013.01)

(58) Field of Classification Search
None
See application file for complete search history.

(56) References Cited

U.S. PATENT DOCUMENTS

2005/0122273 A1 6/2005 Legay et al.
2009/0219903 A1* 9/2009 Alamouti ................. H01Q 3/30 342/372
2010/0085272 A1* 4/2010 Legay .................. H01Q 19/104 343/912

(Continued)

FOREIGN PATENT DOCUMENTS

CN 106025561 A 10/2016
CN 106848588 A 6/2017

(Continued)

OTHER PUBLICATIONS

Hirokazu Kamoda et al:"60-GHz Electronically Reconfigurable Large Reflectarray Using Single-Bit Phase Shifters", IEEE Transactions on Antennas and Propagation, vol. 59, No. 7, Jul. 2011, total 8 pages.

(Continued)

*Primary Examiner* — Wilson Lee

(57) ABSTRACT

A reflective array antenna includes a substrate and a plurality of reflective antenna elements. The substrate includes a first surface and a second surface that are disposed opposite to each other, the first surface including at least one mounting area. A plurality of reflective antenna elements is distributed in an array and are disposed in each mounting area. The reflective array antenna in this disclosure can meet a requirement for blind area coverage and can reduce use of an active device to reduce costs.

20 Claims, 9 Drawing Sheets

(56) References Cited

U.S. PATENT DOCUMENTS

| | | | | |
|---|---|---|---|---|
| 2012/0162010 | A1* | 6/2012 | Georgiadis | H01Q 3/46 342/368 |
| 2017/0047663 | A1* | 2/2017 | Hall | G01S 7/38 |
| 2019/0115664 | A1* | 4/2019 | Veihl | H01Q 5/50 |
| 2021/0184362 | A1* | 6/2021 | Hong Loh | H01Q 1/48 |
| 2021/0359409 | A1* | 11/2021 | Gómez-Diaz | H01Q 15/148 |

FOREIGN PATENT DOCUMENTS

| | | |
|---|---|---|
| CN | 110139287 A | 8/2019 |
| CN | 112216995 A | 1/2021 |

OTHER PUBLICATIONS

Hirokazu Kamoda et al:“60-GHz Electrically Reconfigurable Reflectarray Using p-i-n Diode”,Jun. 7-12, 2009, total 4 pages.

Xiaotian Pan et al:“Mode Analysis of 1-Bit Reflectarray Element Using p-i-n Diode at W-band”,Jul. 9-14, 2017, total 2 pages.

Wang Di et al:“A Subwavelength 1-Bit Broadband Reconfigurable Reflectarray Element Based on Slotting Technology”, 2019 International Applied Computational Electromagnetics Society Symposium’China (ACES), Applied Computational Electromagnetics Society, vol. 1, Aug. 8, 2019 (Aug. 8, 2019), pp. 1-2, XP033749121.

* cited by examiner

REFLECTIVE ARRAY ANTENNA AND BASE STATION

CROSS-REFERENCE TO RELATED APPLICATIONS

This application is a continuation of International Application No. PCT/CN2022/076939 filed on Feb. 18, 2022, which claims priority to Chinese Patent Application No. 202110226874.9 filed on Mar. 1, 2021. The disclosures of the aforementioned applications are hereby incorporated by reference in their entireties.

TECHNICAL FIELD

This disclosure relates to the field of antenna technologies, and in particular, to a reflective array antenna and a base station.

BACKGROUND

With fast development of the communication industry, a capacity of a communication system continuously increases, and an operating frequency band is increasingly high. To ensure communication quality, more base stations need to be added to improve a signal coverage range.

In a signal coverage process of a communication network, to reduce a quantity of deployed base stations and costs, a reflective array antenna may be added to cover a blind area. However, when an active reflective array is used for coverage, costs increase due to an active device in the active reflective array.

Therefore, an antenna is urgently needed to resolve the foregoing problem.

SUMMARY

This disclosure provides a reflective array antenna, so that a requirement for blind area coverage can be met, and use of an active device can be reduced, thereby reducing costs of the reflective array antenna.

According to a first aspect, this disclosure provides a reflective array antenna, including a substrate and a plurality of reflective antenna elements. The substrate has a first surface and a second surface that are disposed opposite to each other. That the first surface and the second surface are disposed opposite to each other may be understood as that both the first surface and the second surface are parallel to an extension direction of the substrate, and a projection of the first surface on the second surface coincides with the second surface. At least one mounting area is disposed on the first surface, and a plurality of reflective antenna elements distributed in an array are disposed in each mounting area. A row direction of the reflective antenna elements distributed in the array is a horizontal direction, and a column direction of the reflective antenna elements distributed in the array is a vertical direction. Each reflective antenna element may include a diode, a phase-shift delay line, and a radiation patch group. One end of the diode is connected to the radiation patch group, the other end of the diode is connected to the phase-shift delay line, and the phase-shift delay line is configured to be grounded. The radiation patch group includes at least two radiation patches disposed along a column direction.

Because at least two radiation patches along the column direction are connected to one diode, a quantity of used diodes is reduced in a mounting area with an equal area, thereby reducing complexity and costs of the reflective array antenna. In addition, when the diode is in an on state, in a row direction (the horizontal direction), each reflective antenna element corresponds to a diode. In this way, a coverage angle of the reflective array antenna in a row dimension (a horizontal dimension) can be ensured, so that the reflective array antenna can cover a blind area.

The phase-shift delay line may be set to change a length of the reflective antenna element when the diode is in a closed state, so that a reflective phase of the reflective antenna element can be changed.

In some possible embodiments, the reflective array antenna further includes a direct-current bias line. The direct-current bias line is disposed on the second surface of the substrate. The direct-current bias line is connected to the radiation patch group. The direct-current bias line provides current input for the reflective antenna element, so that a current is introduced into the radiation patch group.

In some possible embodiments, to ensure that the current flowing into the radiation patch group is a direct current, the reflective array antenna further includes a plurality of alternating-current isolation units. The alternating-current isolation units are disposed in a one-to-one correspondence with the reflective antenna elements. In one pair of a reflective antenna element and an alternating-current isolation unit, one alternating-current isolation unit connects the direct-current bias line to a radiation patch of the corresponding reflective antenna element. Because the alternating-current isolation unit is provided, an alternating current may be blocked. This ensures that the current flowing into the radiation patch group is a direct current. In this manner, each column of reflective antenna elements may correspond to one direct-current bias line, and one direct-current bias line may be connected to a plurality of alternating-current isolation units; or each row of reflective antenna elements may correspond to one direct-current bias line, and one direct-current bias line may be connected to a plurality of alternating-current isolation units. A plurality of direct-current bias lines are separately connected to a power supply.

It should be noted that the alternating-current isolation unit may be a sector stub or a stub of another shape. Examples are not listed herein, provided that the alternating current can be blocked.

In some possible embodiments, because the radiation patch is disposed on the first surface of the substrate, the direct-current bias line is located on the second surface of the substrate, and the alternating-current isolation unit needs to pass through the substrate when connecting the direct-current bias line to the radiation patch. Therefore, to enable the alternating-current isolation unit to be conveniently connected to the radiation patch, a plurality of metallized vias are formed on the substrate.

It should be noted that a quantity of metallized vias is the same as a quantity of reflective antenna elements. In addition, the metallized via may be formed in an etching manner.

In some possible embodiments, the substrate may include a first dielectric layer substrate, a first floor, and a second dielectric layer substrate. The first floor is disposed between the first dielectric layer substrate and the second dielectric layer substrate, and one end that is of the phase-shift delay line and that is away from the diode is connected to the first floor so that the reflective array antenna forms a loop.

In a process of forming the metallized vias on the substrate, a plurality of first vias, a plurality of second vias, and a plurality of third vias may be disposed on the first dielectric layer substrate, the second dielectric layer substrate, and the first floor, respectively, and the plurality of first vias, the plurality of second vias, and the plurality of third vias are in a one-to-one correspondence to form the metallized vias. To enable the alternating-current isolation unit to be insulated from the first floor when passing through the metallized vias, an insulation material may be coated in the third vias to prevent the alternating-current isolation unit from contacting the first floor. The phase-shift delay line is connected to the first floor. Therefore, a fourth via may be further disposed on the first dielectric layer substrate so that the phase-shift delay line passes through the fourth via and is connected to the first floor.

Alternatively, when a plurality of first vias, a plurality of second vias, and a plurality of third vias are provided, a hole diameter of the second via is set to be less than a hole diameter of the third via. In this way, when the alternating-current isolation unit connects the direct-current bias line to the radiation patch group, the alternating-current isolation unit passes through the second via, the third via, and the first via to connect to the radiation patch. Because the hole diameter of the second via is less than the hole diameter of the third via, to ensure that the alternating-current isolation unit can pass through the second via, a size of a part that is of the alternating-current isolation unit and that passes through the second via needs to be set to be less than or equal to the hole diameter of the second via. In addition, the hole diameter of the second via is less than the hole diameter of the third via. In this way, when the part that is of the alternating-current isolation unit and that passes through the second via passes through the third via, the part does not contact with the third via (that is, does not contact with the first floor), thereby preventing the alternating-current isolation unit from being connected to the first floor.

It should be noted that the first dielectric layer substrate, the first floor, and the second dielectric layer substrate may be pressed into a whole in a press-fitting manner.

In some possible embodiments, the radiation patch group may include two radiation patches. The two radiation patches may be connected in series. One of the two radiation patches is connected to the alternating-current isolation unit, the other of the two radiation patches is connected to one end of the diode, and the other end of the diode is grounded (connected to the first floor of the substrate) through the phase-shift delay line, so that each reflective antenna element forms a loop.

It should be noted that, alternatively, the radiation patch group may include three or four radiation patches, provided that a quantity of radiation patches can meet a requirement that when the diode is in an open or on state, a reflection amplitude and a reflection phase fall within specified ranges, and horizontal ±600 scanning and vertical ±10° scanning can be performed.

In addition, the two radiation patches included in the radiation patch group may alternatively be disposed in parallel.

In some possible embodiments, the radiation patch can be disposed on the substrate, provided that the radiation patch can meet a coverage angle of the reflective array antenna in a horizontal dimension so that the reflective array antenna can cover a blind area. An included angle between the radiation patch and the first surface of the substrate may be between 0° and 180°. During disposing, the radiation patch may be disposed in parallel with the first surface of the substrate; the radiation patch may be disposed perpendicular to the first surface of the substrate; or the radiation patch may be disposed at an angle of 44° to 46° relative to the first surface of the substrate. However, in a disposing process, an actual angle between the radiation patch and the first surface of the substrate may have a specific error with a specified angle, and the error may range from 10 to 3° and from −3° to −1. For example, when a specified angle between the radiation patch and the first surface of the substrate is 45°, the angle between the radiation patch and the first surface of the substrate may be any one of 42°, 43°, 44°, 45°, 46°, 47°, or 48°.

The radiation patch may be disposed at an angle of 45° relative to the substrate, or the radiation patch is disposed on the first surface of the substrate in any form.

It should be noted that the radiation patch is made of a metal material. The radiation patch may be in a plurality of shapes. For example, the radiation patch can be rectangular, circular, diamond-shaped, or oval.

In some possible embodiments, there are a plurality of mounting areas disposed on the first surface of the substrate. The plurality of mounting areas may be arranged in a row direction. In the row direction, a spacing between two adjacent mounting areas is greater than a spacing between two columns of reflective antenna elements. The quantity of reflective antenna elements on the first surface of the substrate is reduced to reduce a quantity of active devices.

According to a second aspect, this disclosure further provides a base station, where the base station includes the reflective array antenna in any one of the foregoing technical solutions. In the reflective array antenna, each reflective antenna element includes at least two radiation patches disposed along a column direction, and the at least two radiation patches disposed along the column direction are connected to one diode. In this way, a quantity of diodes used in the reflective array antenna is small, thereby reducing costs of the reflective array antenna. Because the base station includes the reflective array antenna, costs of the base station are also reduced.

REFERENCE NUMERALS

10: substrate; 11: first dielectric layer substrate; 12: first floor; 13: second dielectric layer substrate; 20: reflective antenna element; 21: radiation patch group; 210: radiation patch; 22: diode; 23: phase-shift delay line; 30: direct-current bias line; and 40: alternating-current isolation unit.

DESCRIPTION OF EMBODIMENTS

To make the objectives, technical solutions, and advantages of this disclosure more clear, the following further describes embodiments in detail with reference to the accompanying drawings.

Figure 1:
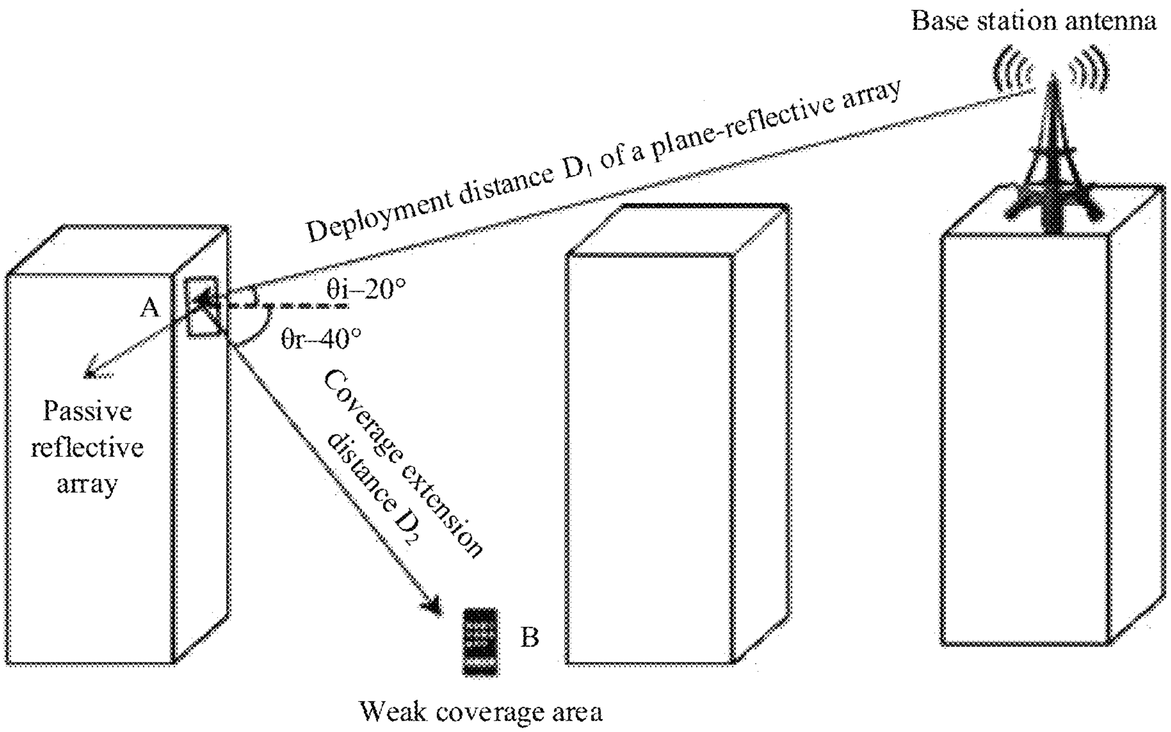
Prior Art FIG. 1
FIG. 1 is a schematic diagram of a structure of applying a passive reflective array to antenna a base station.

Currently, refer to FIG. 1. To improve communication quality and a signal coverage range, more base stations need to be constructed, and a larger quantity of base stations to be constructed require more costs. To reduce the quantity of base stations and reduce costs, a passive reflective array antenna may be added to cover a blind area. Specifically, a passive reflective array antenna is disposed at a position at a specified distance from a base station antenna, and an angle between a connection line between the passive reflective array antenna and the base station antenna and a horizontal plane is 20°. The passive reflective array antenna may reflect a signal of the base station antenna to a receiving device within a specified distance and a specified angle (40°), so that the receiving device can receive the signal.

However, the passive reflective array antenna in the foregoing solution cannot implement beam scanning, and cannot meet a variable environment requirement.

In view of this deficiency, this disclosure provides a reflective array antenna to meet a requirement for blind area coverage. The reflective array antenna can further perform beam scanning, to adapt to a variable environment requirement.

Terms used in the following embodiments are merely intended to describe specific embodiments, but not to limit this application. The terms "one", "a", "the", and "the foregoing" of singular forms used in this specification and the appended claims of this application are also intended to include expressions such as "one or more", unless otherwise specified in the context clearly.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in some other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Figure 2:
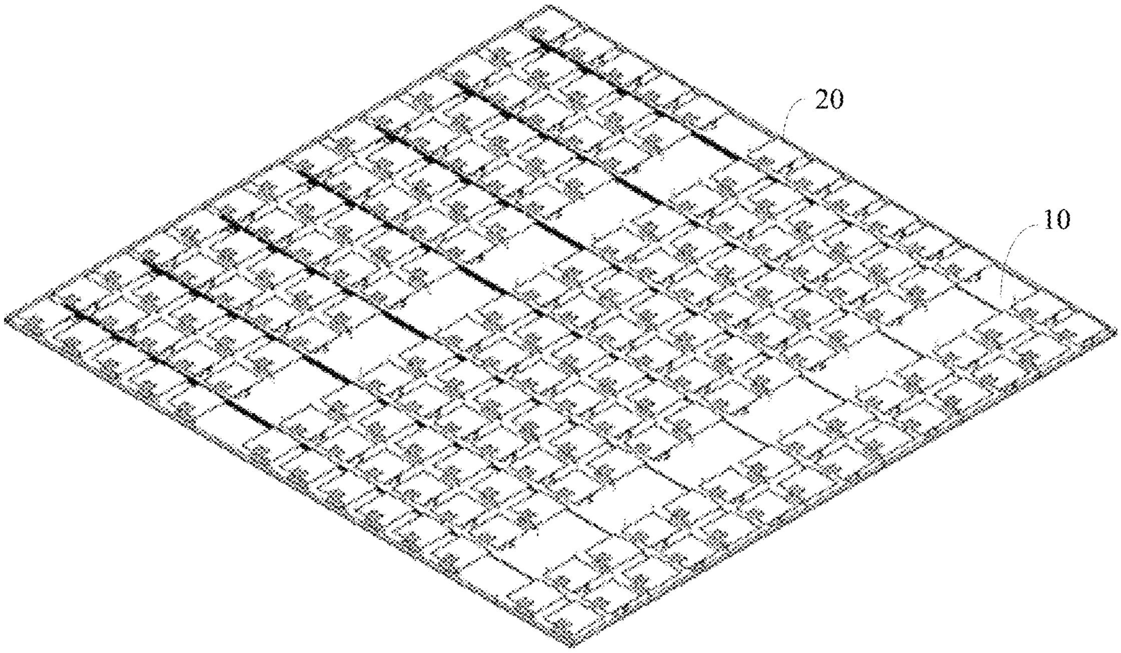
FIG. 2 is a schematic diagram of a structure of a reflective array antenna according to an embodiment of this disclosure.
Figure 3:
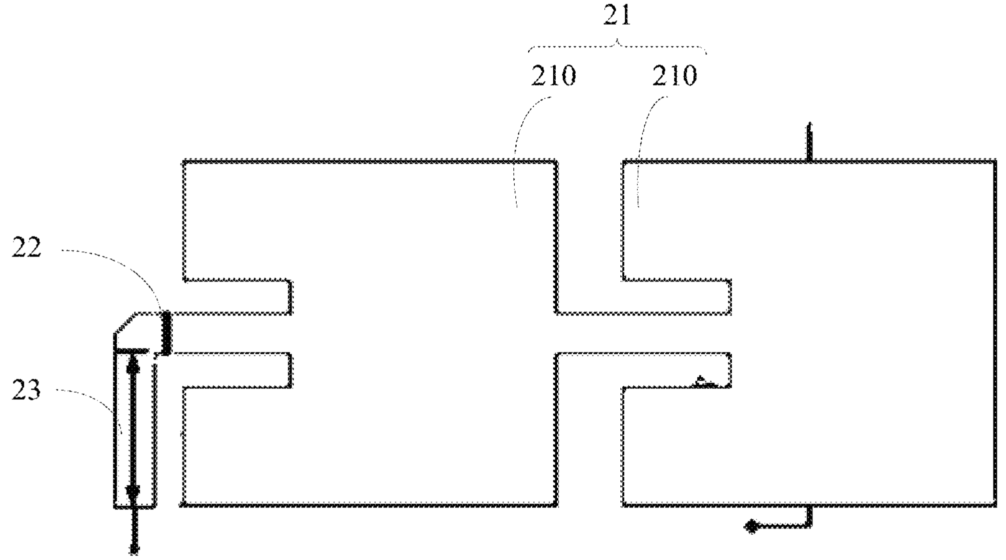
FIG. 3 is a schematic diagram of a structure of a radiation patch group in a reflective array antenna according to an embodiment of this disclosure.

Refer to FIG. 2 and FIG. 3. A reflective array antenna provided in embodiments of this disclosure includes a substrate 10 and a plurality of reflective antenna elements 20. The substrate 10 has a first surface and a second surface that are disposed opposite to each other, a plurality of mounting areas are disposed on the first surface, and a plurality of reflective antenna elements 20 distributed in an array are disposed in each mounting area. Each reflective antenna element 20 includes a radiation patch group 21, a phase-shift delay line 23, and a diode 22. One end of the diode 22 is connected to the radiation patch group 21, the other end of the diode 22 is connected to the phase-shift delay line 23, and the phase-shift delay line 23 is configured to be grounded. Specifically, refer to FIG. 2. A row direction of the plurality of reflective antenna elements 20 distributed in the array is a horizontal direction, and a column direction of the plurality of reflective antenna elements 20 distributed in the array is a vertical direction. The radiation patch group 21 may include at least two radiation patches 210 disposed in the column direction (the vertical direction). When the diode 22 is in an on state, one diode may drive at least two radiation patches 210 along the column direction. Therefore, in a mounting area with an equal area, a quantity of used diodes 22 may be reduced, thereby reducing complexity and costs of the reflective array antenna. In addition, in the row direction (the horizontal direction), each reflective antenna element 20 includes one diode. When the diode 22 is in a closed state, a signal further needs to pass through a distance of the phase-shift delay line 23. Therefore, the reflective array antenna can perform scanning at a predetermined angle in the horizontal direction, to ensure that the reflective array antenna can cover a sufficient range.

It should be noted that the phase-shift delay line 23 may be set to change a length of the reflective antenna element 20 when the diode 22 is in the closed state so that a reflection phase of the reflective antenna element 20 can be changed. In this way, the reflective array antenna can reach a preset reflection phase.

Still refer to FIG. 3. In some embodiments, each radiation patch group 21 may include two radiation patches 210, and the two radiation patches 210 may be connected in series. In the two radiation patches 210 connected in series, one radiation patch 210 is connected to the diode 22, and the other radiation patch is configured to receive a current. When there are two radiation patches 210 in the radiation patch group 21, and the two radiation patches 210 are connected in series, because the two radiation patches 210 are arranged in the column direction (the vertical direction), in the row direction (the horizontal direction), the two radiation patches 210 are in one row. Therefore, a quantity of diodes is not reduced in the row direction. In this way, the reflective array antenna can perform scanning at a predetermined angle in the row direction, to enable a signal of the reflective array antenna to cover a blind area.

It should be noted that there may be three or four radiation patches in the radiation patch group, provided that a reflection phase and a reflection amplitude of the reflective array antenna in an operating frequency band can be met, and horizontal scanning and vertical scanning can be performed at a preset angle.

Figure 4:
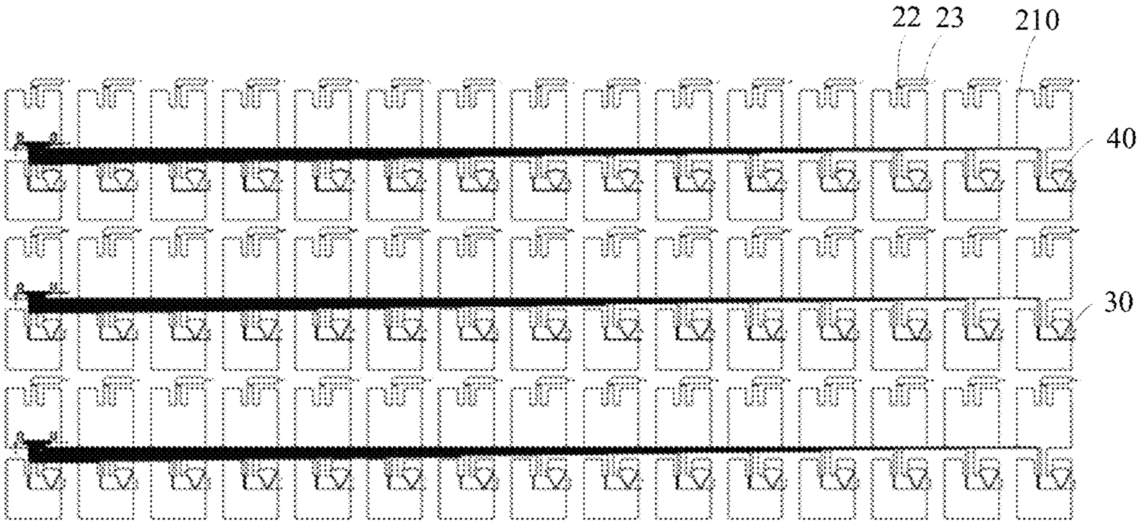
FIG. 4 is another schematic diagram of a structure of a reflective array antenna according to an embodiment of this disclosure.
Figure 5:
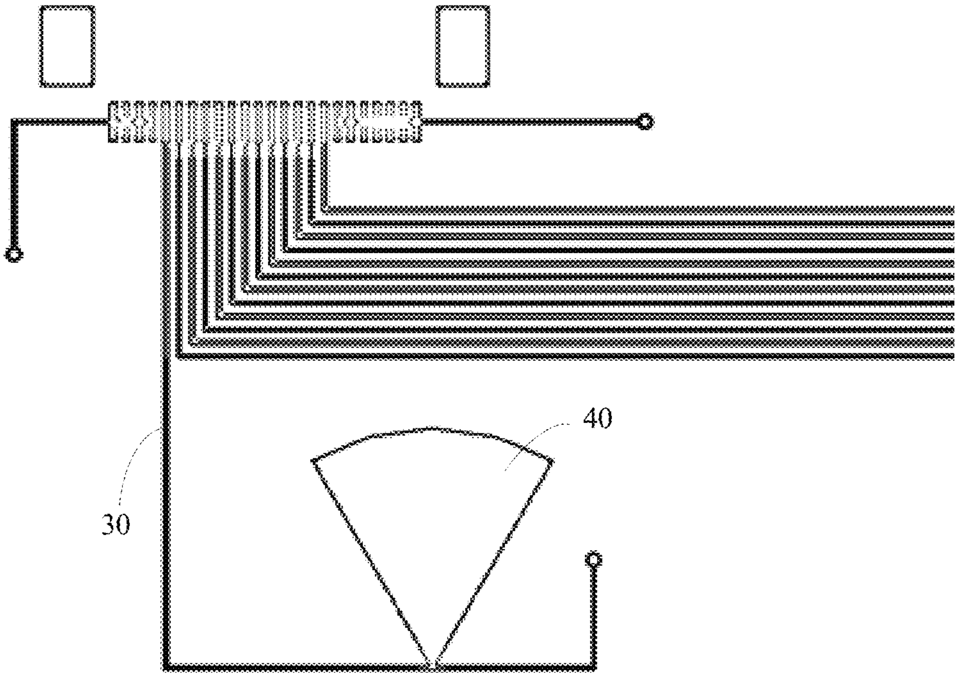
FIG. 5 is a schematic diagram of a structure of a direct-current bias line in a reflective array antenna according to an embodiment of this disclosure.

Refer to FIG. 4 and FIG. 5. In some possible embodiments, the reflective array antenna further includes a direct-current bias line 30, the direct-current bias line 30 is located on the second surface of the substrate, and the direct-current bias line 30 is configured to connect to the radiation patch group. Specifically, the direct-current bias line 30 may be disposed in a row direction or a column direction. When the direct-current bias line 30 is connected to one radiation patch 210 in the radiation patch group, one radiation patch group in each reflective antenna element corresponds to one alternating-current isolation unit 40, one end of the alternating-current isolation unit 40 passes through the substrate and is connected to the radiation patch group on the first surface of the substrate, and the other end of the alternating-current isolation unit 40 is connected to the direct-current bias line 30. In this way, a current in the direct-current bias line 30 flows into the radiation patch group after passing through the alternating-current isolation unit 40. Because the reflective antenna element requires a direct current during operating, the alternating-current isolation unit 40 is disposed between the direct-current bias line 30 and the radiation patch group, to ensure that the current entering the radiation patch group is a direct current. In this case, the diode 22 is closed, and the current entering the radiation patch group may pass through the diode 22 and the phase-shift delay line 23 to a ground end, to form a closed loop.

It should be noted that the alternating-current isolation unit 40 may be a sector stub (not limited to the sector stub).

In the foregoing embodiment, to facilitate the alternating-current isolation unit to be connected to the radiation patch group through the substrate, a plurality of metallized vias are disposed on the substrate. The plurality of metallized vias are distributed on the substrate in an array, and each metallized via corresponds to one patch in the radiation patch group. When the direct-current bias line is connected to the radiation patch, one end of the alternating-current isolation unit may be directly connected to the radiation patch in the radiation patch group through the metallized via, thereby reducing antenna installation difficulty.

Figure 6:
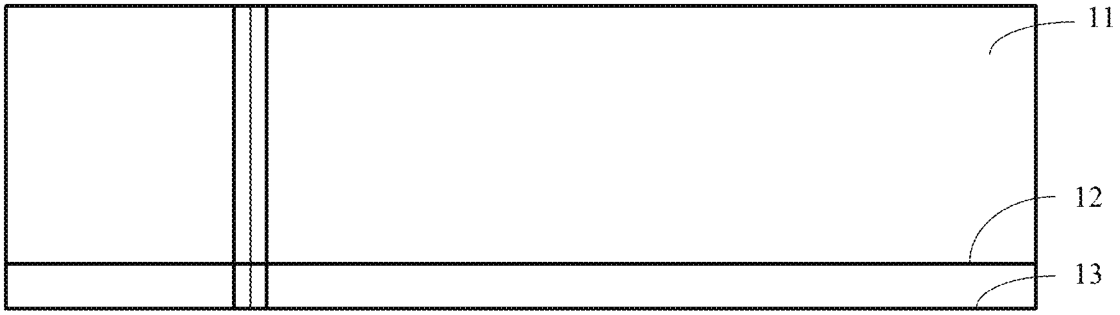
FIG. 6 is a schematic diagram of a structure of a substrate in a reflective array antenna according to an embodiment of this disclosure.

Refer to FIG. 6. In some possible embodiments, the substrate may include a first dielectric layer substrate 11, a first floor 12, and a second dielectric layer substrate 13, where the first floor 12 is disposed between the first dielectric layer substrate 11 and the second dielectric layer substrate 13, and the first dielectric layer substrate 11, the first floor 12, and the second dielectric layer substrate 13 may be prepared in a press-fitting manner. When the metallized via is formed on the substrate, because the first floor 12 is connected to the phase-shift delay line, the first floor 12 is used as the ground end, and the alternating-current isolation unit needs to pass through the metallized via to connect to the radiation patch group when a current is conveyed to the radiation patch group, to prevent a short circuit of the current in the direct-current bias line from being generated in a conveying process, the metallized via may be insulated from the first floor, to prevent the alternating-current isolation unit from contacting with the first floor 12 when passing through the metallized via.

It should be noted that in a process of forming the metallized vias on the substrate, a plurality of first vias, a plurality of second vias, and a plurality of third vias are disposed on the first dielectric layer substrate 11, the second dielectric layer substrate 13, and the first floor 12 respectively, and the plurality of first vias, the plurality of second vias, and the plurality of third vias are in a one-to-one correspondence to form the metallized vias. To enable the alternating-current isolation unit to be insulated from the first floor 12 through the metallized vias, an insulation material may be coated in the third vias to prevent the alternating-current isolation unit from contacting the first floor 12. Alternatively, a hole diameter of the second via is set to be less than a hole diameter of the third via. In this way, when the alternating-current isolation unit connects the direct-current bias line to the radiation patch group, the alternating-current isolation unit needs to pass through the second via, the third via, and the first via to connect to the radiation patch. Because the hole diameter of the second via is less than the hole diameter of the third via, to ensure that the alternating-current isolation unit can pass through the second via, a size of a part that is of the alternating-current isolation unit and that passes through the second via needs to be less than or equal to the hole diameter of the second via. In addition, the hole diameter of the second via is less than the hole diameter of the third via. When the part that is of the alternating-current isolation unit and that passes through the second via passes through the third via, the part does not contact with the third via (that is, does not contact the first floor) to prevent the alternating-current isolation unit from being connected to the first floor 12.

In addition, to enable the phase-shift delay line to be connected to the first floor 12 and the phase-shift delay line to be located on one side of the first surface of the substrate, a plurality of fourth vias may be further disposed on the first dielectric layer substrate 11. The fourth vias may be disposed to facilitate the phase-shift delay line connection to the first floor 12.

In the foregoing embodiment, when the radiation patch is disposed on the first surface of the substrate, the radiation patch is vertically disposed on the first surface of the substrate. Alternatively, the radiation patch may be disposed in parallel with the first surface of the substrate, or the radiation patch may be disposed at an angle of 45° relative to the first surface of the substrate, provided that the reflective antenna array having the radiation patch can perform horizontal scanning, and reflect a signal to a blind area so that a signal in the blind area is better.

In addition, the radiation patch may be rectangular, diamond-shaped, circular, oval, or the like. Details are not described herein.

Figure 7:
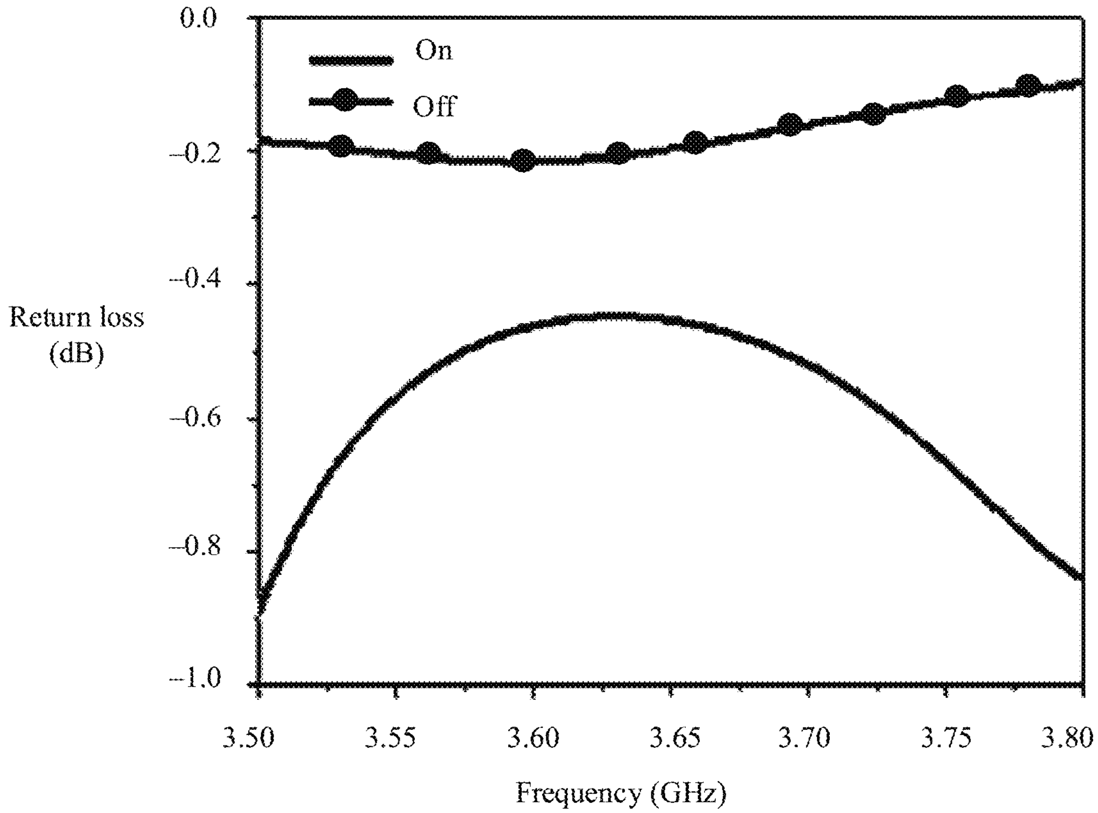
FIG. 7 is a simulation diagram of a reflection amplitude in a reflective array antenna according to an embodiment of this disclosure.
Figure 8:
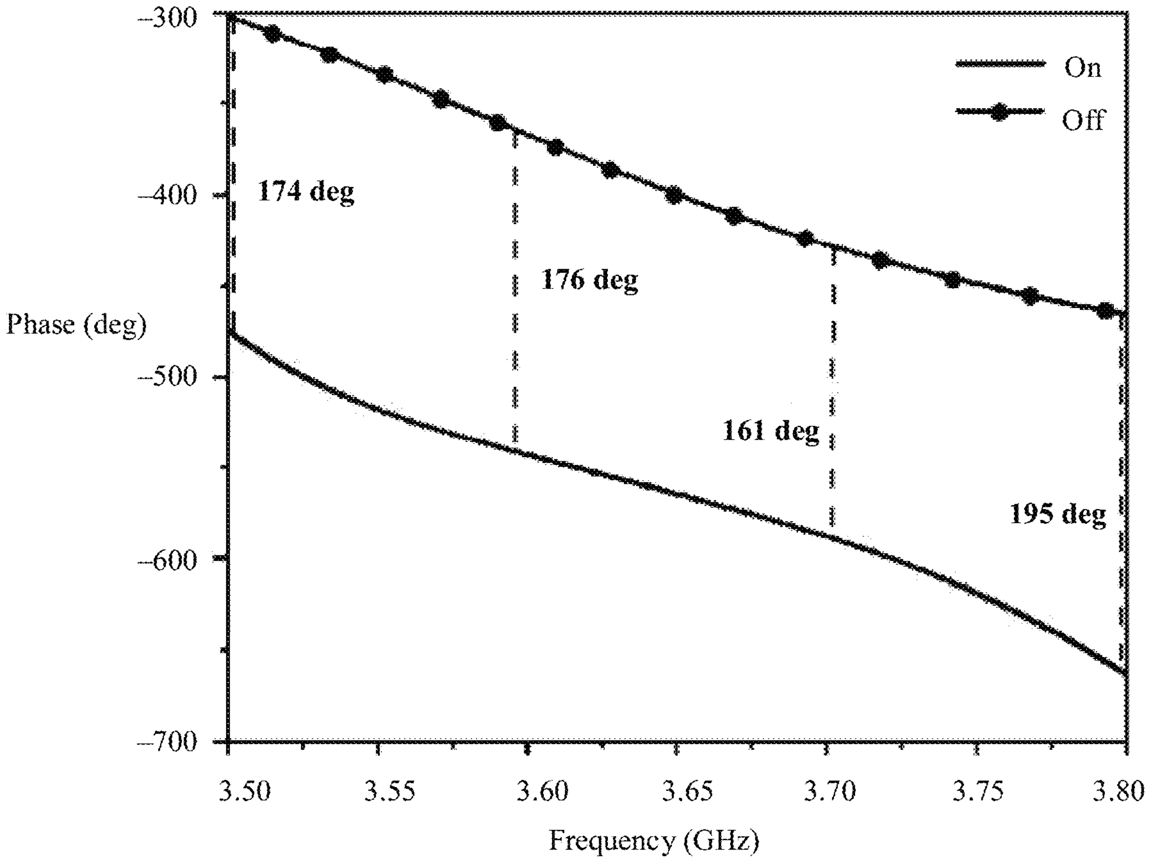
FIG. 8 is a simulation diagram of a reflection phase in a reflective array antenna according to an embodiment of this disclosure.

For a better description that the reflective antenna array in this solution can meet a coverage range while reducing a quantity of diodes (active device), FIG. 7 is a simulation diagram of a reflection amplitude in an example in which there are two radiation patches in the radiation patch group, the two radiation patches are connected in series, and an operating frequency band is 3.6 GHz to 3.8 GHz. FIG. 8 is a simulation diagram of a reflection phase in the example in which there are two radiation patches in the radiation patch group, the two radiation patches are connected in series, and the operating frequency band is 3.6 GHz to 3.8 GHz. It can be learned from FIG. 7 and FIG. 8 that the two series-connected radiation patches meet a phase difference of 180±200 in the operating frequency band of 3.6 GHz to 3.8 GHz, and a reflection loss in the operating frequency band is less than 1 dB.

Figure 9:
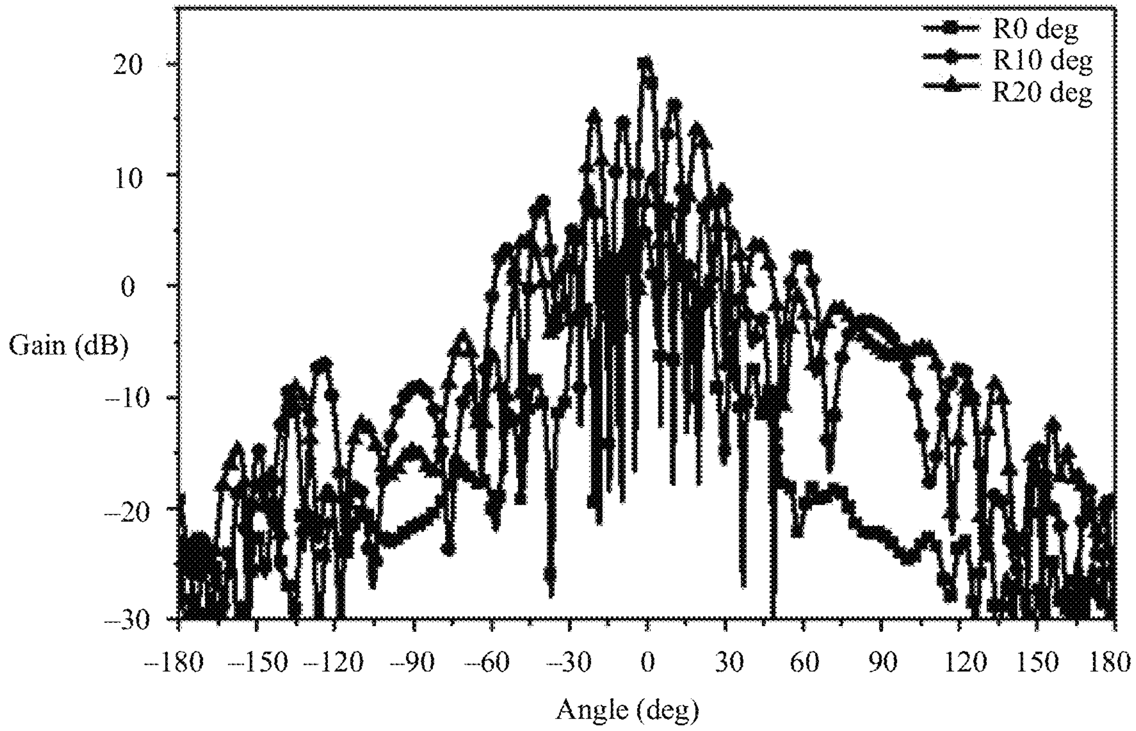
FIG. 9 is a simulation diagram 1 of horizontal scanning of a reflective array antenna according to an embodiment of this disclosure.
Figure 10:
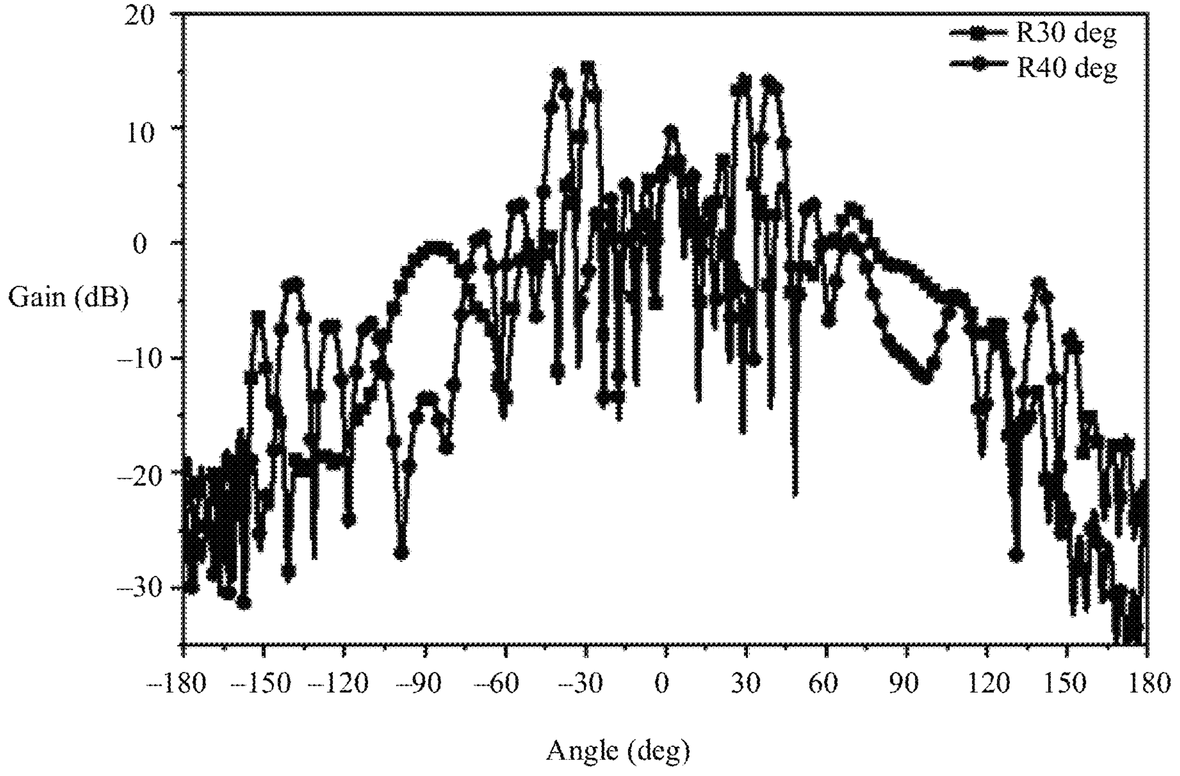
FIG. 10 is a simulation diagram 2 of horizontal scanning of a reflective array antenna according to an embodiment of this disclosure.
Figure 11:
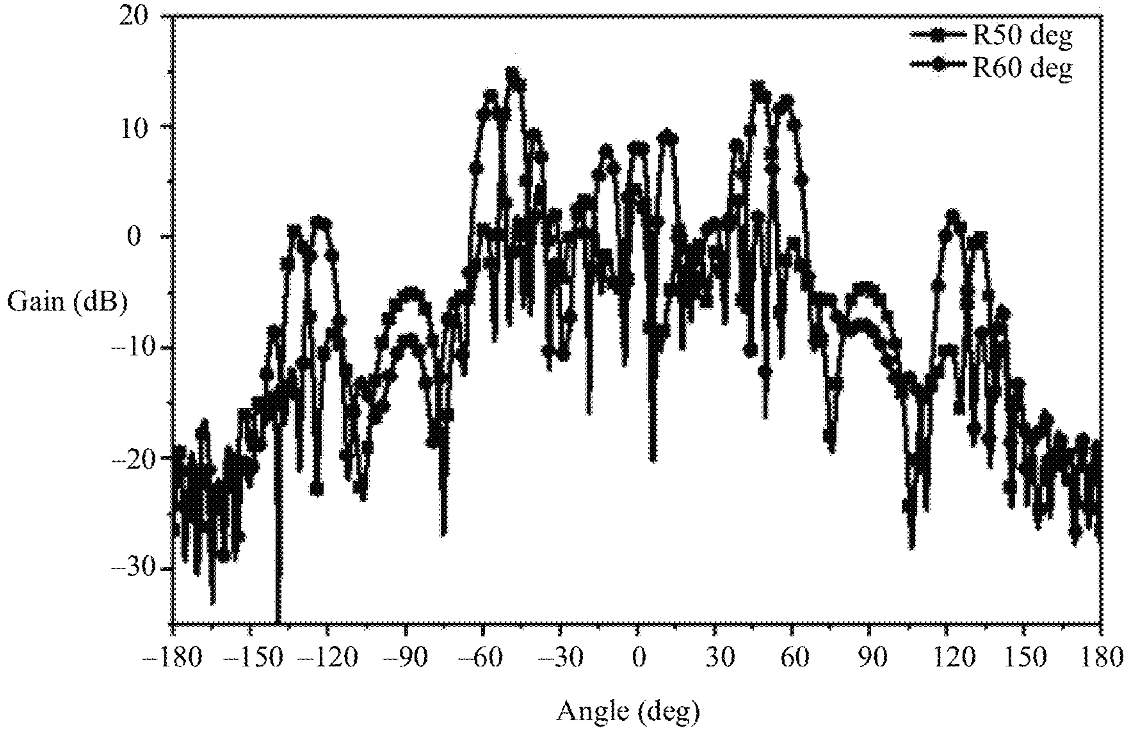
FIG. 11 is a simulation diagram 3 of horizontal scanning of a reflective array antenna according to an embodiment of this disclosure.
Figure 12:
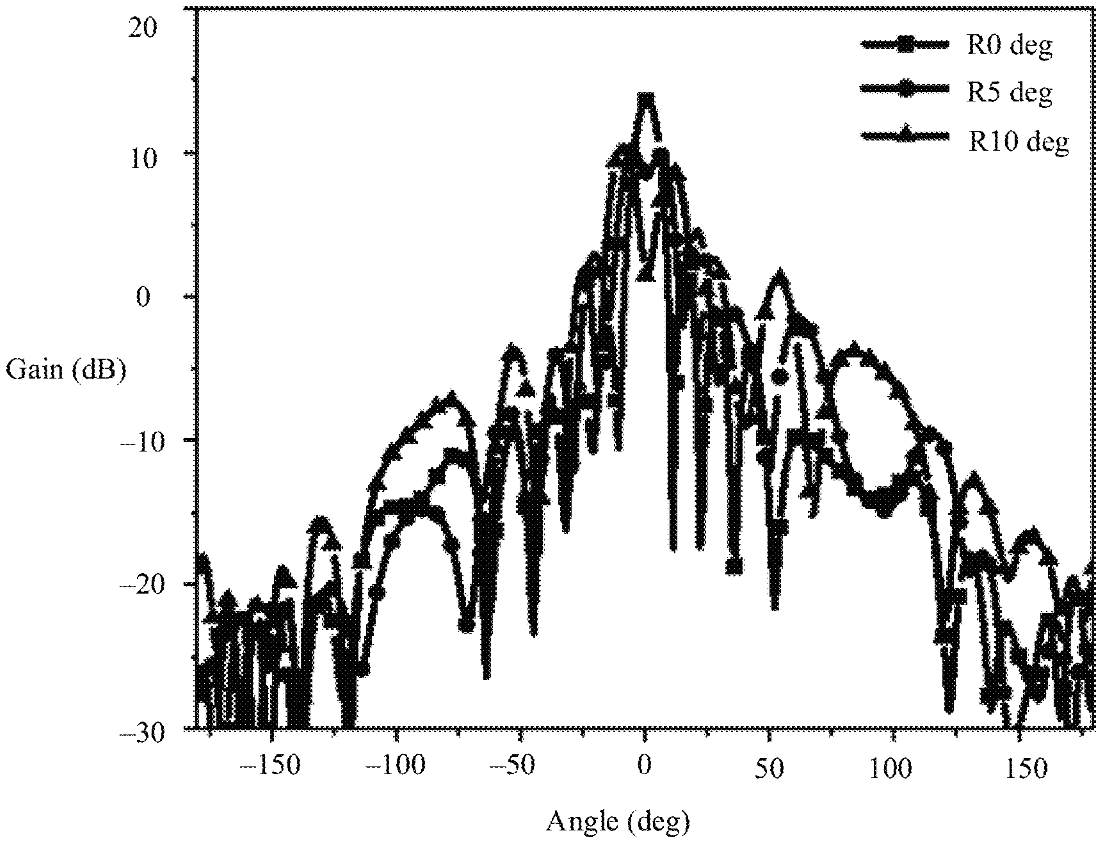
FIG. 12 is a simulation diagram of vertical scanning of a reflective array antenna according to an embodiment of this disclosure.

FIG. 9 to FIG. 11 are simulation diagrams of performing horizontal±60° scanning on the reflection antenna array. FIG. 12 is a simulation diagram of performing vertical±10° scanning on the reflection antenna array. As shown in FIG. 9 to FIG. 12, a horizontal beam of the reflective array antenna can implement 0°, ±10°, ±20°, ±30°, ±40°, ±50°, and ±600 scanning, and a vertical beam of the reflective array antenna can implement 0° and ±100 scanning. It indicates that when the radiation patch group includes two radiation patches that are connected in series, beam scanning of the formed reflective array antenna in both the horizontal direction and the vertical direction can be performed in a preset range, thereby ensuring that a requirement of a coverage blind area can be met and costs of the reflective array antenna are reduced when the reflective array antenna reduces use of an active device.

In some possible embodiments, there may be a plurality of mounting areas, and the plurality of mounting areas may be distributed at spacings along a row direction. In each mounting area, spacings between every two adjacent columns of reflective antenna elements are the same. Along the row direction, a spacing between two adjacent mounting areas is greater than the spacing between the two columns of reflective antenna elements. In this way, disposing the plurality of mounting areas on the first surface of the substrate can reduce at least one column of reflective antenna elements, thereby reducing a quantity of used active devices.

In a specific implementation process, there may be two radiation patches included in each radiation patch group, and the two radiation patches may be connected in parallel. In the two radiation patches connected in parallel, one end of each radiation patch is connected to the diode, and the other end of each radiation patch is configured to receive a current. When there are two radiation patches in the radiation patch group, and the two radiation patches are connected in parallel, because the two radiation patches are arranged in the column direction (the vertical direction), in the row direction (the horizontal direction), the two radiation patches are in one row. Therefore, a quantity of diodes is not reduced in the row direction. In this way, the reflective array antenna can perform scanning at a predetermined angle in the row direction, to enable a signal of the reflective array antenna to cover a blind area.

This disclosure further provides a base station, where the base station includes the reflective array antenna in any one of the foregoing technical solutions. In the reflective array antenna, each reflective antenna element includes at least two radiation patches disposed along a column direction, and the at least two radiation patches disposed along the column direction are connected to one diode. In this way, a quantity of diodes used in the reflective array antenna is small, thereby reducing cost of the reflective array antenna. Because the base station includes the reflective array antenna, costs of the base station are also reduced.

The foregoing descriptions are merely specific implementations and are not intended to limit the protection scope of this disclosure. Any variation or replacement readily figured out by a person skilled in the art within the technical scope of this disclosure shall fall within the protection scope of the claims.

What is claimed is:

1. A reflective array antenna, comprising:
- a substrate having a first surface and a second surface disposed opposite one another; and
- a plurality of reflective antenna elements, each comprising a diode, a phase-shift delay line, and a radiation patch group, wherein:
  - the first surface of the substrate includes at least one mounting area, the plurality of reflective antenna elements is distributed in an array, and the reflective antenna elements being disposed in each mounting area;
  - each diode includes first and second ends, the first end of each diode being connected to the radiation patch group of the reflective antenna element, the second end of each diode being connected to the phase-shift delay line of the reflective antenna element, the phase-shift delay line being configured to be grounded; and
  - each radiation patch group comprises at least two radiation patches disposed along a first direction to form a column of radiation patches.

2. The reflective array antenna according to claim 1, wherein two radiation patches are provided, the two radiation patches being connected in series, and the first end of the diode is connected to one end of one of the radiation patches.

3. The reflective array antenna according to claim 2, further comprising a direct-current bias line disposed on the second surface of the substrate and configured to connect to the radiation patch at another end of the radiation patch.

4. The reflective array antenna according to claim 3, further comprising a plurality of alternating-current isolation units that are disposed in a one-to-one correspondence with the plurality of reflective antenna elements, wherein for each pair of a reflective antenna element and an alternating-current isolation unit, each alternating-current isolation unit connects the direct-current bias line to a radiation patch of the corresponding reflective antenna element.

5. The reflective array antenna according to claim 4, wherein a plurality of metallized vias is disposed on the substrate, and each alternating-current isolation unit is connected to the corresponding radiation patch through one of the metallized vias.

6. The reflective array antenna according to claim 5, wherein the substrate further comprises a first dielectric layer substrate, a first floor, and a second dielectric layer substrate; and
- the first floor is disposed between the first dielectric layer substrate and the second dielectric layer substrate.

7. The reflective array antenna according to claim 6, wherein each of the plurality of metallized vias is insulated from the first floor.

8. The reflective array antenna according to claim 4, wherein two radiation patches are provided, one radiation patch is connected to the diode, and the other radiation patch is connected to the alternating-current isolation unit.

9. The reflective array antenna according to claim 4, wherein the alternating-current isolation unit is a sector stub.

10. The reflective array antenna according to claim 1, wherein:
- each radiation patch is disposed in parallel with the substrate; or
- each radiation patch is disposed perpendicular to the substrate; or
- an included angle between the radiation patch and the substrate is 44° to 46°.

11. The reflective array antenna according to claim 1, wherein each radiation patch is rectangular, circular, or diamond-shaped.

12. The reflective array antenna according to claim 1, wherein the first surface of the substrate includes a plurality of mounting areas arranged along a second direction, and a distance between every two adjacent mounting areas is greater than a distance between two adjacent reflective antenna elements along the second direction.

13. The reflective array antenna according to claim 1, wherein two radiation patches are provided, the two radiation patches being connected in parallel, and the first end of the diode is separately connected to each of the two radiation patches.

14. A base station, comprising:
- a reflective array antenna, wherein the reflective antenna comprises:
  - a substrate having a first surface and a second surface that are disposed opposite to each other; and
  - a plurality of reflective antenna elements, wherein:
    - the first surface of the substrate is provided with at least one mounting area, and the plurality of reflective antenna elements are distributed in an array disposed in each mounting area; and each reflective antenna element comprises a diode, a phase-shift delay line, and a radiation patch group, wherein a first end of the diode is connected to the radiation patch group, the second end of the diode is connected to the phase-shift delay line, the phase-shift delay line being configured to be grounded, each radiation patch group comprises at least two radiation patches disposed along a first direction.

15. The base station according to claim 14, wherein two radiation patches are provided that are connected in series, and the first end of the diode is connected to one end of one of the radiation patches.

16. The base station according to claim 15, further comprising a direct-current bias line disposed on the second surface of the substrate and configured to connect to the radiation patch at another end of the radiation patch.

17. The base station according to claim 16, further comprising a plurality of alternating-current isolation units that are disposed in a one-to-one correspondence with the plurality of reflective antenna elements, wherein for each pair of a reflective antenna element and an alternating-current isolation unit, each alternating-current isolation unit connects the direct-current bias line to a radiation patch of the corresponding reflective antenna element.

18. The base station according to claim 17, wherein a plurality of metallized vias is disposed on the substrate, and each alternating-current isolation unit is connected to the corresponding radiation patch through one of the metallized vias.

19. The base station according to claim 18, wherein the substrate further comprises a first dielectric layer substrate, a first floor, and a second dielectric layer substrate; and the first floor is disposed between the first dielectric layer substrate and the second dielectric layer substrate.

20. The base station according to claim 19, wherein each of the plurality of metallized vias is insulated from the first floor.

* * * * *